United States Patent [19]

Takeda

[11] Patent Number: 4,835,411
[45] Date of Patent: May 30, 1989

[54] ACTIVE FILTER UNIT
[75] Inventor: Masatoshi Takeda, Hyogo, Japan
[73] Assignee: Mitsubishi Denki Kabushiki Kaisha, Tokyo, Japan
[21] Appl. No.: 222,729
[22] Filed: Jul. 22, 1988
[30] Foreign Application Priority Data
  Jul. 24, 1987 [JP] Japan .................. 62-183592
[51] Int. Cl.⁴ .................. H02J 3/36; H02M 5/40
[52] U.S. Cl. .................. 307/105; 307/104; 307/401; 363/37; 363/35; 323/210; 323/211
[58] Field of Search .................. 307/105–109, 307/127, 11, 401, 3, 240, 104; 363/35, 40, 41, 42, 43, 46, 47, 72, 98, 95, 132, 159, 161, 48; 323/207, 206, 209, 210, 211, 214, 218, 248, 263, 356; 330/11, 144, 149, 207 A, 284, 310; 328/69; 333/195, 196

[56] References Cited
U.S. PATENT DOCUMENTS
4,139,723  2/1979  Havas .................. 323/210 X
4,555,659 11/1985  Gyugyi .................. 323/210
4,651,265  3/1987  Stacey et al. .................. 363/35
4,692,851  9/1987  Attwood .................. 363/37 X OTHER PUBLICATIONS
Akagi et al., "Control Strategy of Active Power Filters Using Multiple Voltage-Source PWM Converters", IEEE Transactions on Industry Applications, vol. 1A-22, No. 3, pp. 460–465.

Primary Examiner—William M. Shoop, Jr.
Assistant Examiner—Paul Ip
Attorney, Agent, or Firm—Bernard, Rothwell & Brown

[57] ABSTRACT

An active filter unit comprising a first active filter which operates under low-frequency PWM control for controlling the fundamental and low-order harmonic capacity and a second active filter which operates under high-frequency PWM control for controlling the high-order harmonic capacity. The first and second active filters are connected in series through associated transformers that are in serial connection across the power lines. The divided filter arrangement reduces the required power rating of high-frequency switching devices.

7 Claims, 4 Drawing Sheets

ACTIVE FILTER UNIT

BACKGROUND OF THE INVENTION

1. Field of the Invention

The present invention relates to an active filter unit and, particularly, to an active filter unit used in a power transmission and distribution system for compensating harmonic currents.

2. Description of the Prior Art

FIG. 1 is a circuit diagram of the conventional active filter disclosed in the article entitled "Principle of Active Filter Compensation" in the proceeding of annual convention of the electric and information society, section 4, trend of active filter for power system, held in 1985.

In the figure, indicated by 1 is an a.c. power source, 2 is a harmonic current generating load coupled to the a.c. power source 1, 3 is a transformer, 4a–4d are transistor switches which constitute a single-phase bridge inverter connected across the secondary winding of the transformer 3, 5 is a capacitor, and 6 is an active filter constituted by the transformer 3, transistor switches 4a–4d, and capacitor 5.

Next, the operation will be described. The transistor switches 4a–4d are controlled in PWM (pulse width modulation) mode by a gate control circuit (not shown) so that they produce an a.c. output voltage $E_I$ with a synthesized waveform from a d.c. voltage $E_d$ charged in the capacitor 5, and the voltage $E_I$ is applied to the secondary winding of the transformer 3. FIG. 2 shows the equivalent circuit for this operation, in which indicated by 7 is an imaginary voltage source provided by the active filter 6, and 8 is the impedance of the transformer 3. For the fundamental-wave voltage $E_{AC}$ of the a.c. power source 1 and the a.c. output voltage $E_I$ of the active filter the following equation is established.

$$L(dI_{AF})/dt = E_I - E_{AC} \quad (2)$$

where $I_{AF}$ is the output current of the active filter, and L is the impedance of the transformer 3.

The following harmonic current $I_H$ flowing through the load 2 is assumed.

$$I_H = I_N \cdot \sin(N\omega t) \quad (2)$$

By controlling the active filter output current $I_{AF}$ to be equal to $I_H$, it becomes possible that the current $I_S$ of the a.c. power source does not include a harmonic current.

In this case, equations (1) and (2) are reduced to the following.

$$N\omega L \cdot I_N \cdot \cos(N\omega t) = E_I - E_{AC} \quad (3)$$

Accordingly, the active filter needs to provide the following a.c. output voltage $E_I$.

$$E_I = E_{ACI} + N\omega L \cdot I_N \cdot \cos(N\omega t) \quad (4)$$

The active filter needs to have the following output capacity VA.

$$VA + E_I \cdot I_{AF} + E_{AC} \cdot I_{AF} + N\omega L \cdot I_N \cdot \cos(N\omega t) \cdot I_{AF} \quad (5)$$

In equation (5), the first term on the right side represents the fundamental-wave capacity, and the second term represents the harmonic capacity. Usually the fundamental-wave capacity is greater than the harmonic capacity.

Conventional active filters are arranged as described above, and therefore necessitate control for both the fundamental-wave capacity and harmonic capacity. In case of compensating up to a higher-order harmonic current, the transistor switches 4a–4d need to be operated under high-frequency PWM control. The unnecessary high-frequency PWM operation involving the fundamental and low-order harmonic currents imposes an increased switching loss. Moreover, large capacity transistors operative in high-frequency switching are difficult to manufacture, and therefore manufacturing of a capacious active filter unit is also difficult.

SUMMARY OF THE INVENTION

The present invention is intended to overcome the foregoing prior art deficiencies, and its prime object is to provide an active filter unit, which is a serial connection of a low-frequency PWM-control active filter dealing with a fundamental-wave capacity and low-order harmonic-wave capacity and a high-frequency PWM-control active filter dealing with a high-order harmonic-wave capacity, having less switching loss and capable of having a large capacity.

The inventive active filter unit is divided into a first active filter (low-frequency PWM-control active filter) which controls the fundamental and low-order harmonic capacity and a second active filter (high-frequency PWM-control active filter) which controls the high-order harmonic capacity, with the first and second active filters in serial connection through low-frequency and high-frequency PWM-control active filter transformers being connected in parallel to the a.c. power source.

Other objects and features of this invention will become more apparent from the following description of embodiments taken in conjunction with the accompanying drawings.

DETAILED DESCRIPTION OF THE PREFERRED EMBODIMENTS

Figure 1:
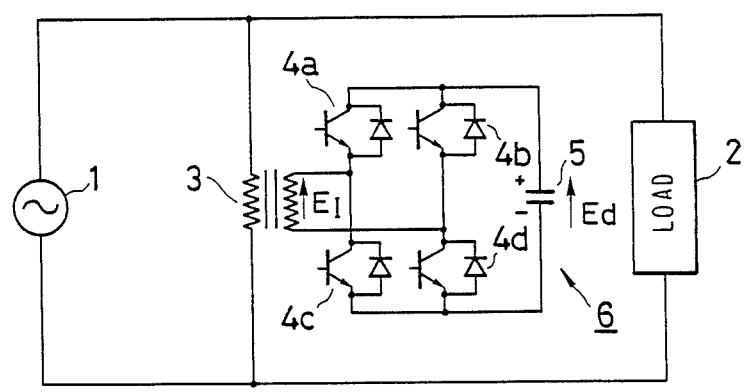
FIG. 1 is a schematic diagram showing the conventional active filter unit.
Figure 2:
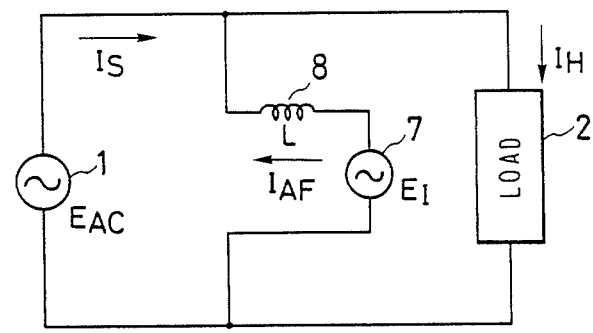
FIG. 2 is an equivalent circuit of the active filter unit of FIG. 1 used to explain the operation.

An embodiment of this invention will be described with reference to FIG. 3, in which components identical to those in FIG. 1 are given the common symbols. In the figure, indicated by 9 is a transformer for a low-frequency PWM-control active filter, 10a–10d are transistor switches for low-frequency PWM control, 11 is a capacitor, 12 is a low-frequency PWM-control active filter (first active filter) constituted by the transformer 9, transistor switches 10a–10d and capacitor 11. Indicated by 13 is a transformer for a high-frequency PWM-control active filer, 14a–14d are transistor switches for high-frequency PWM control, 15 is a capacitor, and 16 is a high-frequency PWM-control active filter (second active filter) constituted by the transformer 13, transistor switches 14a–14d and capacitor 15.

Next, the operation will be explained. In FIG. 3, d.c. voltages $E_{d1}$ and $E_{d2}$ charged in the capacitors 11 and 15, respectively, are subjected to PWM control by means of the low-frequency and high-frequency PWM-control transistor switches 10a–10d and 14a–14d, and resulting output voltages $E_{f1}$ and $E_{f2}$ having a shaped waveform are applied to the corresponding transformers 9 and 13.

Figure 4:
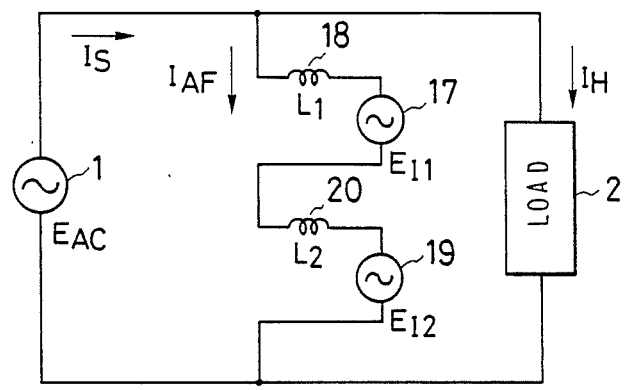
FIG. 4 is an equivalent circuit of the active filter unit of FIG. 3 used to explain the operation.

This operation is expressed by the equivalent circuit of FIG. 4. In the figure, indicated by 17 is an imaginary voltage source provided by the low-frequency PWM-control active filter 12, 18 is the impedance of the low-frequency PWM transformer 9, 19 is an imaginary voltage source provided by the high-frequency PWM-control active filter 16, and 20 is the impedance of the high-frequency PWM transformer 13.

The following equation is established for the voltages $E_{f1}$, $E_{f2}$ and $E_{AC}$ and the active filter output current $I_{AF}$.

$$(L_1+L_2)(dI_{AF})/(dt)=E_{f1}+E_{f2}-E_{AC} \qquad (6)$$

where L1 and L2 are inductances of the impedances 18 and 20.

The following expression is given to the output current $I_{AF}$ (harmonic current) of the active filter.

$$I_{AF}+I_{N1}\cdot\sin(N_1\omega t)+I_{N2}\cdot\sin(N_2\omega t) \qquad (7)$$

where $I_{N1}$ represents a low-order harmonic component, and $I_{N2}$ represents a high-order harmonic component.

Equations (6) and (7) in combination are reduced to as follows.

$$N_1\omega(L_1+L_2)I_{N1}\cdot\cos(N_1\omega t)+N_2\omega(L_1+L_2)I_{N2}\cdot\cos(N_2\omega t)=E_{f1}+E_{f2}-E_{AC} \qquad (8)$$

Equation (8) is satisfied by placing the low-frequency and high-frequency active filter imaginary source voltages $E_{f1}$ and $E_{f2}$ as follows.

$$E_{f1}=E_{AC}+N_1\omega(L_1+L_2)I_{N1}\cdot\cos(N_1\omega t) \qquad (9)$$

$$E_{f2}=N_2\omega(L_1+L_2)I_{N2}\cdot\cos(N_2\omega t) \qquad (10)$$

Accordingly, $E_{f1}$ is to include a fundamental-wave voltage $E_{AC}$ and low-order harmonic voltage $N_1\omega(L_1+L_2)I_{N1}\cos(N_1\omega t)$, and $E_{f2}$ is to include a high-order harmonic voltage $N_2\omega L \cdot I_{N2}\cdot\cos(N_2\omega t)$.

The low-frequency PWM-control active filter 12 and high-frequency PWM-control active filter 16 have capacities $VA_1$ and $VA_2$ given as follows.

$$VA_1=E_{AC}I_{AF}+N_1\omega(L_1+L_2)I_{N1}\cdot\cos(N_1\omega t)\cdot I_{AF} \qquad (11)$$

$$VA_2=N_2\omega(L_1+L_2)I_{N2}\cdot\cos(N_2\omega t)\cdot I_{AF} \qquad (12)$$

In other words, the low-frequency PWM-control active filter 12 takes the load of the fundamental and low-order harmonic capacity, while the high-frquency PWM-control active filter 16 takes the load of the high-order harmonic capacity. The low-frequency PWM-control active filter 12 does not need high-frequency control, but suffices to operate in low-frequency PWM-control, and it may be formed of medium speed switching devices such as GTO thyristors. The high-frequency PWM-control active filter 16 needs high-frequency PWM-control, but with a small capacity for controlling only the high-order harmonic capacity, and therefore the switching loss can be minimized.

Figure 3:
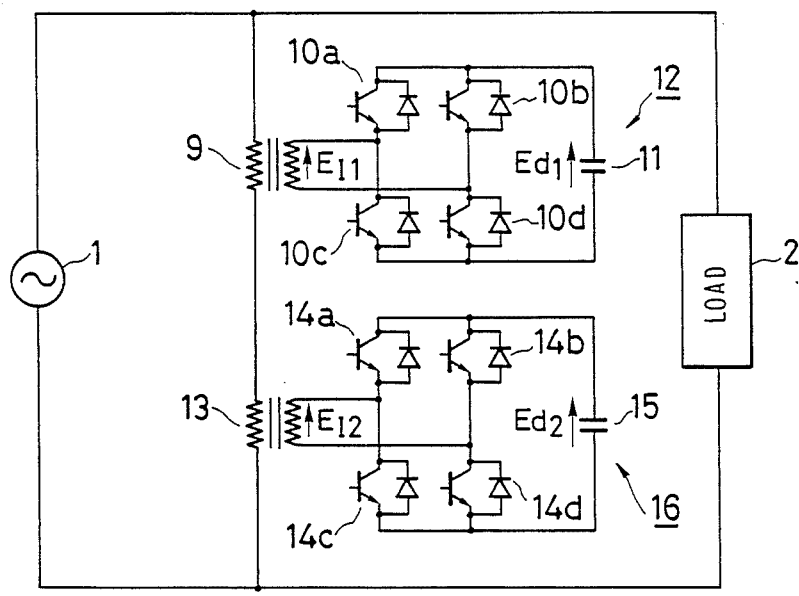
FIG. 3 is a schematic diagram of the active filter unit embodying the present invention.
Figure 5:
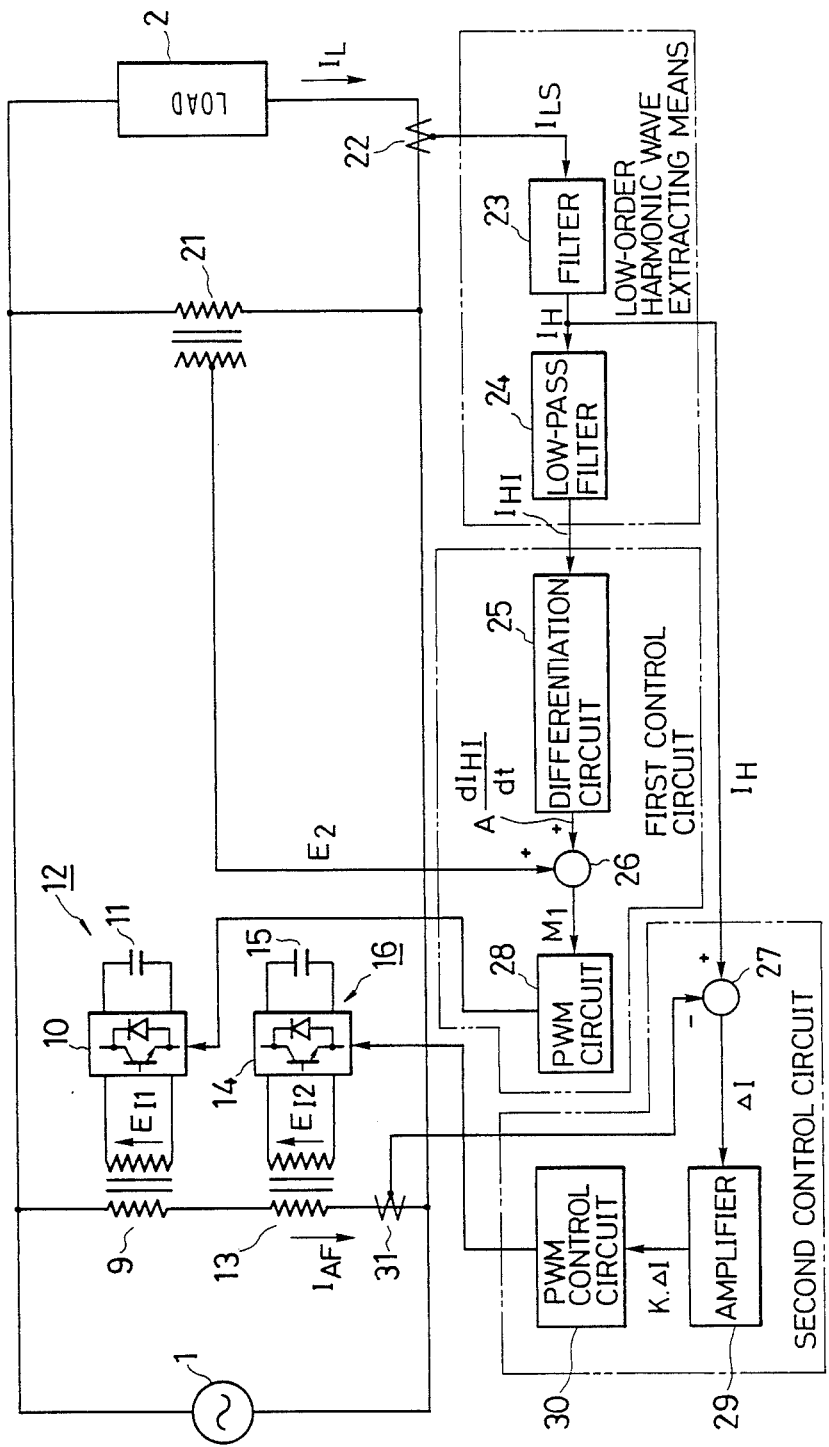
FIG. 5 is a block diagram of the control circuit for the arrangement shown in FIG. 3.

FIG. 5 shows the control circuit of the active filter unit shown in FIG. 3. In the figure, indicated by 21 is a voltage transformer for detecting the supply voltage, 22 is a current transformer (harmonic current detection means) for detecting the load current $I_L$, 23 is a filter for eliminating a fundamental wave component, 24 is a low-pass filter for blocking high-order harmonic components (the fundamental-wave eliminating filter 23 and low-pass filter 24 are called integrally "a low-order harmonic extraction means), 25 is a differentiation circuit, 26 is an adding circuit which sums the output of the differentiation circuit 25 and the secondary voltage of the voltage transformer 21, 27 is a subtraction circuit, 28 is a low-frequency PWM circuit for the low-frequency PWM-control active filter 12, 29 is an amplifier, and 30 is a high-frequency PWM circuit for the high-frequency PWM-control active filter 16. The differentiation circuit 25, adding circuit 26 and low-frequency PWM circuit 28 are called integrally "the first control circuit", and the subtracting circuit 27, amplifier 29 and high-frequency PWM circuit 30 are called integrally "the second control circuit".

Next, the operation of the control circuit of FIG. 5 will be explained. The current transformer 22 detects the load current $I_L$ and sends the load current signal $I_{LS}$ to the fundamental-wave eliminating filter 23 so that a harmonic current component $I_H$ is extracted. The fundamental-wave eliminating filter 23 is formed of a high-pass filter, for example, which extracts only the harmonic current component (reference) $I_H$ included in the load current $I_L$ to produce a harmonic current reference signal. The harmonic current component $I_H$ is fed to the low-pass filter 24, which blocks high-order components of the harmonic current reference signal $I_{H1}$ and produces a low-order harmonic current reference signal $I_{H1}$.

Subsequently, the low-order harmonic current reference signal $I_{H1}$ is fed to the differentiation circuit 25, which produces an output $A(dI_{H1}/dt)$. This signal is added to the voltage signal $E_2$ from the secondary winding of voltage transformer 21 by the adder 26, and a control signal $M_1$ is produced. When the value of A is chosen to be $L_1+L_2$, the following equation is established, and it becomes a control signal equivalent to equation (9).

$$\begin{aligned} M_1 &= E_2 + A\frac{dI_{H1}}{dt} \\ &= E_{AC} + (L_1+L_2)\frac{dI_{H1}}{dt} \\ &= E_{AC} + N_1\omega(L_1+L_2)I_{N1}\cdot\cos(N_1\omega t) \end{aligned} \qquad (13)$$

The control signal $M_1$ acts as a feed-forward signal and, by being fed to the low-frequency PWM circuit 28 of the next stage, it provides a PWM signal equivalent to the control signal $M_1$ to the low-frequency PWM-control transistor switch 10. Consequently, the low-frequency PWM-control active filter 12 produces the following output.

$$E_{f1}=E_{AC}+N_1\omega(L_1+L_2)I_{N1}\cdot\cos(N_1\omega t) \qquad (14)$$

The harmonic current component (reference) $I_H$ is fed to the subtracting circuit 27, which also receives a feedback signal derived from the output current $I_{AF}$ of the active filer detected by the current transformer 31, and the current difference ΔI is evaluated as follows.

$$\Delta I = I_H - I_{AF} \qquad (15)$$

The current difference ΔI is amplified with a gain K of the amplifier 29, and the resulting K·ΔI is entered to the harmonic PWM-control circuit 30, which then provides a corresponding PWM signal to the high-frequency PWM-control transistor switch 14. Consequently, the high-frequency PWM-control active filter 16 produces an output voltage $E_{f2}$ which corresponds to K·Δ1.

By setting the amplifier gain to be K>>1, the current difference ΔI is made zero and then $I_H = I_{AF}$. As a result, the high-frequency PWM-control active filter 16 produces the voltage of the imaginary source voltage $E_{f2}$ equivalent to equation (10).

$$E_{f2} = N_2 \omega (L_1 + L_2) I_{N2} \cos(N_2 \omega t) \qquad (16)$$

Figure 6:
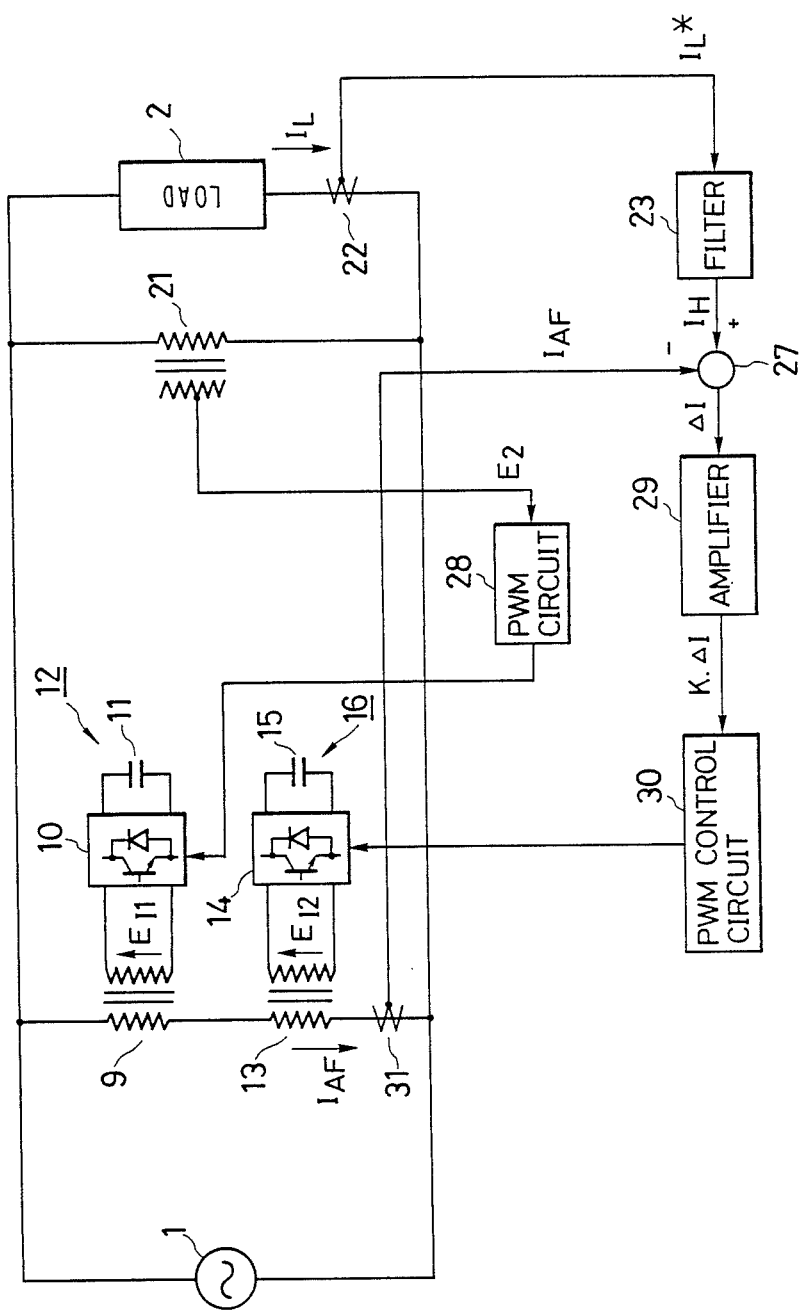
FIG. 6 is a block diagram showing another embodiment of the control circuit.

FIG. 6 shows another embodiment of the control circuit in the inventive active filter unit. In this circuit arrangement, only the secondary voltage $E_2$ of the voltage transformer 21 is entered as a feed-forward signal to the low-frequency PWM-control active filter 12. Accordingly, the low-frequency PWM-control active filter 12 produces the output $E_{f1} = E_{AC}$ so that it is burdened with only the fundamental-wave capacity.

On the other hand, the high-frequency PWM-control active filter 16 is burdened with the harmonic capacity, and produces the following output.

$$E_{f2} = N_1 \omega (L_1 + L_2) \cdot I_{N1} \cos(N_1 \omega t) + N_2 \omega (L_1 + L_2) I_{N2} \cdot \cos(N_2 \omega t) \qquad (17)$$

Although in the foregoing embodiments transistor switches are used to form PWM inverters which constitute the active filters, they may be replaced with GTO thyristors or other semiconductor switches. Alternatively, the high-frequency PWM-control active filter 16 employs transistor switches operative in high-frequency switching, while the low-frequency PWM-control active filter 12 employs GTO thyristors which can have a large capacity although they are limited to low-frequency switching, and the same effectiveness as the preceding embodiment is attained.

Although the foregoing embodiments are voltage-type active filters, the present invention is equally applicable to current-type active filters.

According to the present invention, as described above, a low-frequency PWM-control active filter which deals with the funadamental-wave capacity and low-order harmonic capacity and a high-frequency PWM-control active filter which deals with the high-order harmonic capacity are connected in series, so that the low-frequency region including the fundamental and harmonic components are rendered low-frequency PWM with low-speed but capacious switching devices such as GTO thyristors with the result of less switching loss, while the high-order harmonic region is rendered high-frequency PWM with relatively small capacity but high-speed switching devices, whereby a high-capacity active filter unit operating at a lesser switching loss and having the compensating ability up to a high frequency region can be built as the whole.

What is claimed is:

1. An active filter unit operative by being connected in parallel to an a.c. power source and a load which generates harmonic currents so as to compensate said harmonic load currents, said active filter comprising: a first active filter operating under low-frequency PWM control for controlling a fundamental and low-order harmonic capacity, a first transformer having a secondary winding connected to said first active filter, a second active filter operating under highfrequency PWM control for controlling a high-order harmonic capacity, and a second transformer having a second winding connected to said second active filter, said first and second transformers having primary windings connected in series across said power source.

2. An active filter according to claim 1 further comprising a harmonic current detecting means which detects harmonic currents flowing in said load, a loworder harmonic extracting means which detects relatively low order harmonic curents in said detected harmonic currents, a first control circuit which sums a signal derived from the output of said low-order harmonic extracting means and differentiated by a differentiation circuit and a signal representing a power source voltage, and produces a feed-forward signal for controlling said first active filter, and a second control circuit which receives the output of said harmonic current detecting means as a reference signal and controls said second active filter in a feedback control manner.

3. An active filter according to claim 2, wherein said first control circuit produces a feed-forward signal which is derived solely from the power source voltage.

4. An active filter according to claim 2, wherein said harmonic current detecting means comprises a current transformer.

5. An active filter according to claim 2, wherein said low-order harmonic extracting means comprises a fundamental-wave eliminating filter and a low-pass filter which receives a harmonic current component provided by said fundamental-wave eliminating filter.

6. An active filter according to claim 2, wherein said first control circuit comprises a differentiation circuit which receives the harmonic current reference signal, an adding circuit which receives the output of said differentiation circuit and the output of a voltage transformer, and a low-frequency PWM circuit which receives a control signal provided as an output of said adding circuit.

7. An active filter according to claim 2, wherein said second control circuit comprises a subtracting circuit which subtracts the output of a current transformer which detects the output current of said active filter from a harmonic current component, an amplifier which receives a current difference signal provided as an output of said subtracting circuit, and a high-frequency PWM circuit which receives the output of said amplifier and controls said active filter.

* * * * *

UNITED STATES PATENT AND TRADEMARK OFFICE
CERTIFICATE OF CORRECTION

PATENT NO. : 4,835,411

DATED : May 30, 1989

INVENTOR(S) : Masatoshi Takeda

It is certified that error appears in the above-identified patent and that said Letters Patent is hereby corrected as shown below:

Column 1, line 40, delete "(2)" and insert --(1)--;

line 60, in equation (4), after "$E_{AC}$" delete --$_1$--.

Column 2, line 67, "filer" should be --filter--.

Column 3, line 64, "sufficies" should be --suffices--.

Signed and Sealed this

Twenty-seventh Day of March, 1990

Attest:

JEFFREY M. SAMUELS

*Attesting Officer*　　　*Acting Commissioner of Patents and Trademarks*